(12) United States Patent
Ishii (10) Patent No.: US 12,403,973 B2
(45) Date of Patent: Sep. 2, 2025

(54) HOLDING STRUCTURE FOR OPTIONAL COMPONENT

(71) Applicant: SUZUKI MOTOR CORPORATION, Hamamatsu (JP)

(72) Inventor: Tatsuki Ishii, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 344 days.

(21) Appl. No.: 17/901,621

(22) Filed: Sep. 1, 2022

(65) Prior Publication Data

US 2023/0071497 A1 Mar. 9, 2023

(30) Foreign Application Priority Data

Sep. 9, 2021 (JP) .................................. 2021-146871

(51) Int. Cl.
*B62J 11/00* (2020.01)

(52) U.S. Cl.
CPC .................................... *B62J 11/00* (2013.01)

(58) Field of Classification Search
CPC ............. B62J 11/00; B62J 29/00; B62J 45/00
USPC .......................................... 224/413, 419, 420
See application file for complete search history.

(56) References Cited

U.S. PATENT DOCUMENTS

| | | | | |
|---|---|---|---|---|
| 3,380,698 A * | 4/1968 | Goldberg | ................. | B62J 11/00 224/446 |
| 3,598,295 A * | 8/1971 | Seegers | .................... | B62J 11/00 224/450 |
| 4,436,350 A * | 3/1984 | Jolin | ........................ | B62J 11/00 224/443 |
| 4,697,725 A * | 10/1987 | Miree | ........................ | B62J 6/03 224/463 |
| 4,756,454 A * | 7/1988 | Villanueva | ............. | H04R 1/026 224/418 |
| 5,005,661 A * | 4/1991 | Taylor | ..................... | G01S 7/032 180/219 |
| 5,114,060 A * | 5/1992 | Boyer | ...................... | B62J 11/00 224/431 |
| 5,487,497 A * | 1/1996 | Kwiatkowski | ............. | B62J 7/06 224/454 |

(Continued)

FOREIGN PATENT DOCUMENTS

JP 2004-009969 A 1/2004
JP 2004-098935 A 4/2004

(Continued)

OTHER PUBLICATIONS

Notice of Reasons for Refusal dated Apr. 1, 2025, issued by the Japanese Patent Office in corresponding application JP 2021-146871.

*Primary Examiner* — Peter N Helvey
(74) *Attorney, Agent, or Firm* — Stein IP LLC (57) ABSTRACT

A holding structure for an optional component, the optional component configured to be added to a saddle-type vehicle, the holding structure includes a brace extending forward from a head pipe of a vehicle front portion, a plate supported from below by the brace, and a holder for the optional component provided on the plate. A periphery of a meter configured to display vehicle information is covered with a meter cover. The meter is supported by the plate so as to be exposed from the meter cover, and the optional component is held inside the meter cover by the holder.

12 Claims, 8 Drawing Sheets

(56) References Cited

U.S. PATENT DOCUMENTS

| | | | | |
|---|---|---|---|---|
| 6,390,429 | B1 * | 5/2002 | Brincat | B62J 11/00 |
| | | | | 224/420 |
| 6,957,755 | B2 * | 10/2005 | Mahoney | B62J 11/00 |
| | | | | 224/440 |
| D575,220 | S * | 8/2008 | Pockalny | D12/223 |
| 9,434,437 | B2 * | 9/2016 | Van Dyke | B62J 50/225 |
| 9,487,259 | B2 * | 11/2016 | Lipanski | B62J 11/00 |
| 2003/0226836 | A1 | 12/2003 | Miura et al. | 219/204 |
| 2004/0135722 | A1 | 7/2004 | Takahashi | 342/357.06 |
| 2005/0200518 | A1 | 9/2005 | Takahashi | 342/357.06 |
| 2005/0200519 | A1 | 9/2005 | Takahashi | 342/357.06 |
| 2016/0241816 | A1 | 8/2016 | Noguchi et al. | H04N 7/181 |
| 2019/0054970 | A1 * | 2/2019 | Lee | B62J 17/02 |
| 2023/0013593 | A1 * | 1/2023 | Yaffe | B62K 19/00 |

FOREIGN PATENT DOCUMENTS

| | | |
|---|---|---|
| JP | 2008-143448 A | 6/2008 |
| WO | WO 2015/049792 A1 | 4/2015 |

* cited by examiner

HOLDING STRUCTURE FOR OPTIONAL COMPONENT

CROSS-REFERENCE TO RELATED APPLICATIONS

The disclosure of Japanese Patent Application No. 2021-146871 filed on Sep. 9, 2021, including specification, drawings and claims is incorporated herein by reference in its entirety.

TECHNICAL FIELD

The present invention relates to a holding structure for an optional component.

BACKGROUND ART

A grip heater controller may be installed as an optional component on saddle-type vehicles such as motorcycles. As a saddle-type vehicle of this type, a vehicle in which the grip heater controller is exposed to outside from a side cowl is known (see, for example, Patent Literature 1). The grip heater controller described in Patent Literature 1 is attached to an opening formed in the side cowl. A heater harness extends from a grip heater to an inside of the side cowl, and a controller harness extending from the grip heater controller is connected to the heater harness.

Patent Literature 1: JP-A-2004-009969

SUMMARY OF INVENTION

An aspect of the present invention provide a holding structure for an optional component, the optional component configured to be added to a saddle-type vehicle, the holding structure for the optional component including: a brace extending forward from a head pipe of a vehicle front portion; a plate supported from below by the brace; and a holder for the optional component provided on the plate, in which a periphery of a meter configured to display vehicle information is covered with a meter cover, and the meter is supported by the plate so as to be exposed from the meter cover, and the optional component is held inside the meter cover by the holder.

DESCRIPTION OF EMBODIMENTS

Optional components are required to be installed in places with excellent waterproofness and dustproofness. Further, since the optional components are installed by a dealer or a user, it is desirable to simplify the work of attaching the optional components. The waterproofness and dustproofness for the grip heater controller described in Patent Literature 1 is not sufficient, and a large component such as the side cowl needs to be removed when the grip heater controller is attached.

The present invention has been made in view of the above points, and an object thereof is to provide a holding structure for the optional component by which an optional component is installed in a place with excellent waterproofness and dustproofness and work of attaching the optional component is simplified.

According to the holding structure for the optional component of one aspect of the present invention, the periphery of the meter is covered with a meter cover, and the holder is provided on the plate supporting the meter. By holding the optional component on the holder inside the meter cover, the waterproofness and dustproofness for the optional component can be ensured. By removing the meter and meter cover, the optional component can be attached to the holder, which eliminates the necessity of removing a large cowl and simplifies the attachment work.

In a holding structure for an optional component of an aspect of the present invention, the optional component is added to a saddle-type vehicle. In the holding structure for the optional component, a brace extends forward from a head pipe of a vehicle front portion, and a plate is supported from below by the brace. A periphery of a meter that displays vehicle information is covered by a meter cover, and the meter is supported by the plate so as to be exposed from the meter cover. The plate is provided with a holder for the optional component, and the optional component is held inside the meter cover by the holder, and thus the waterproofness and dustproofness for the optional component can be ensured. By removing the meter and meter cover, the optional component can be attached to the holder, which eliminates the necessity of removing a large cowl and simplifies the attachment work.

EMBODIMENT

Figure 1:
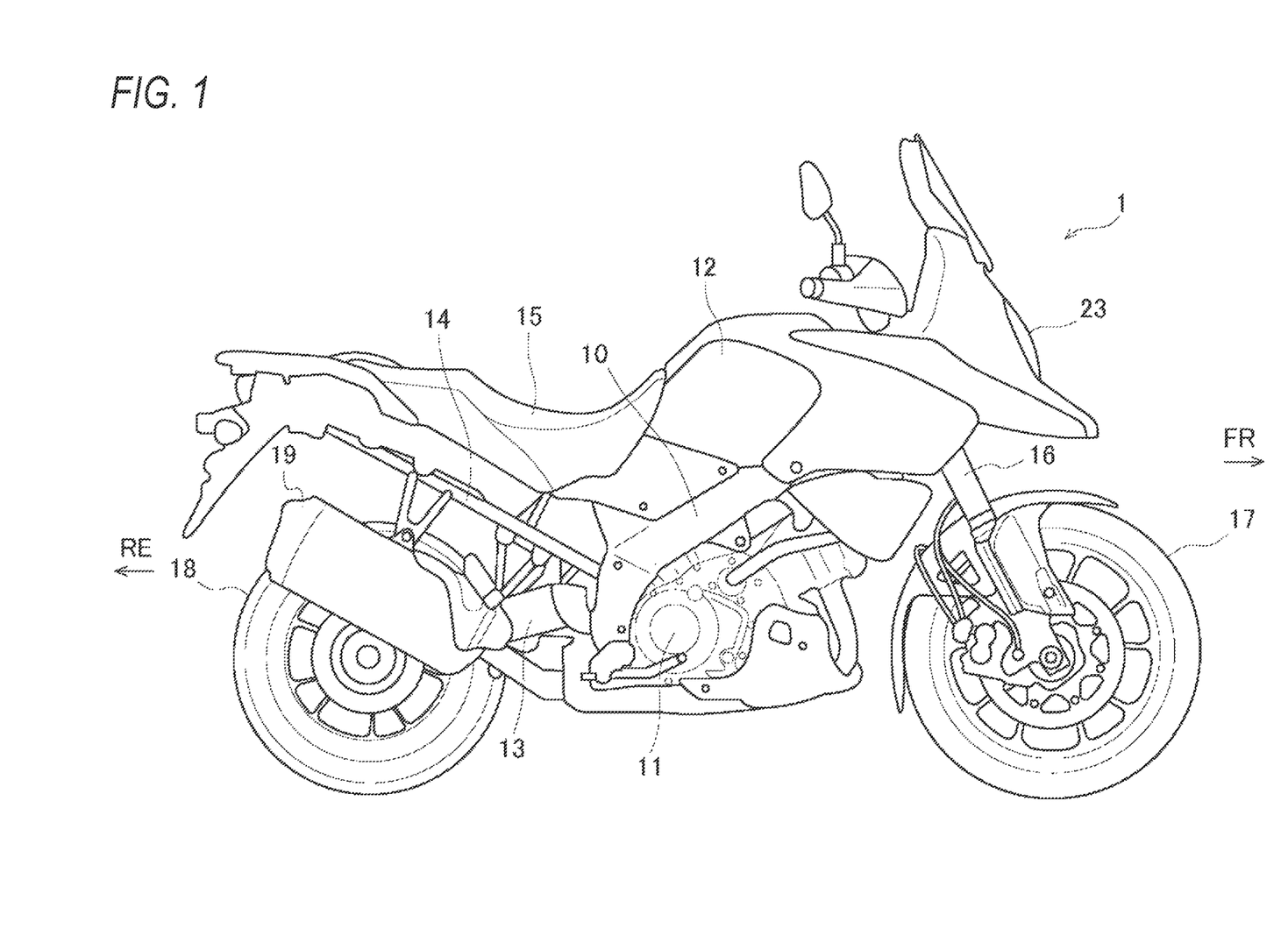
FIG. 1 is a right side view of a straddle-type vehicle according to the present embodiment.
Figure 2:
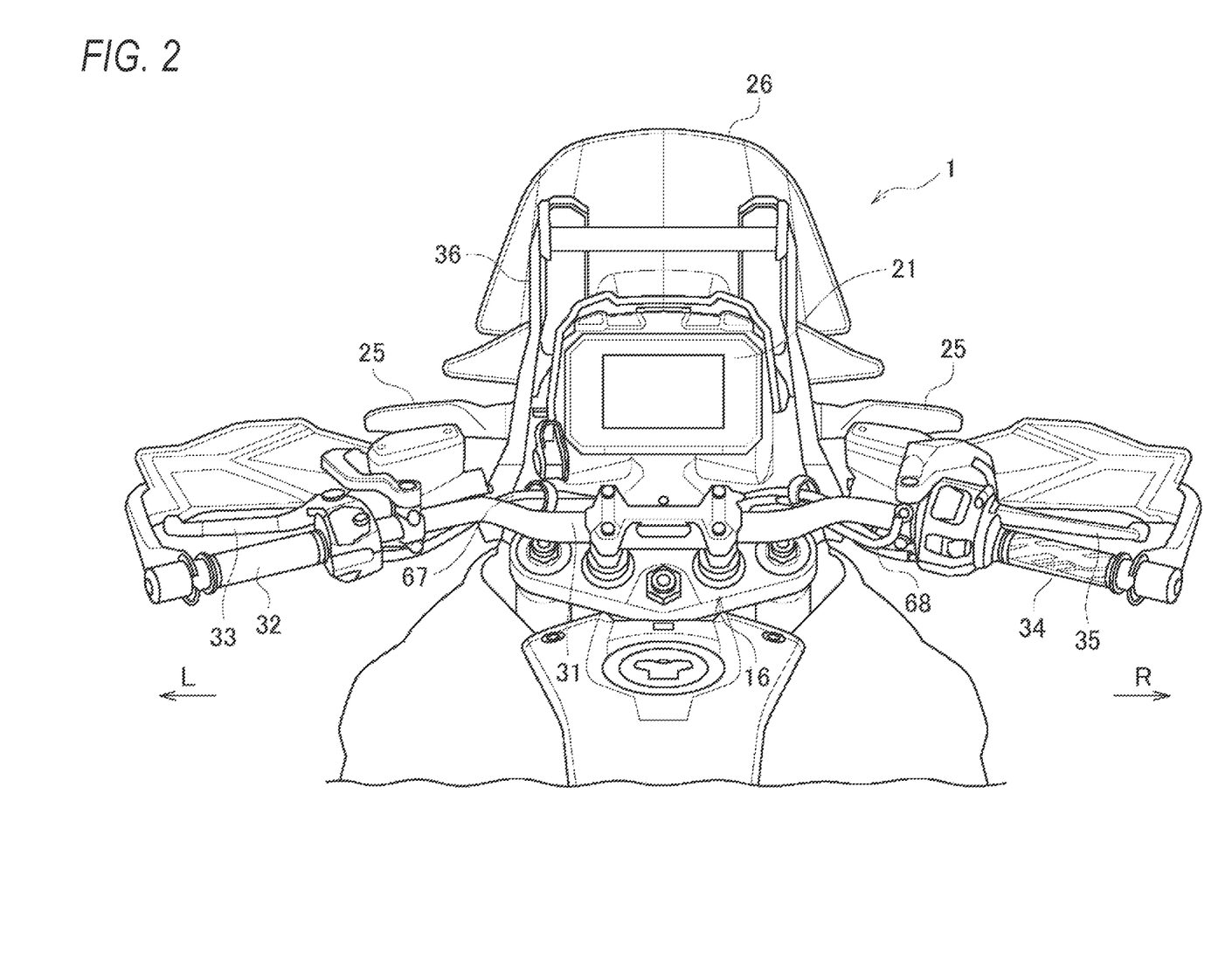
FIG. 2 is a rear view of a vehicle front portion according to the present embodiment.

Hereinafter, the present embodiment will be described in detail with reference to the accompanying drawings. FIG. 1 is a right side view of a straddle-type vehicle according to the present embodiment. FIG. 2 is a rear view of a vehicle front portion according to the present embodiment. In the following drawings, an arrow FR indicates a vehicle front side, an arrow RE indicates a vehicle rear side, an arrow L indicates a vehicle left side, and an arrow R indicates a vehicle right side.

As shown in FIG. 1, a twin spar type vehicle body frame formed of an aluminum alloy is used in the saddle-type vehicle 1. The vehicle body frame includes a pair of main frames 10 branching from a head pipe (not shown) to the left and right and extending rearward so as to embrace an engine 11. A fuel tank 12 is supported from below on the front side of the pair of main frames 10, and a swing arm 13 is swingably supported on the rear side of the pair of main frames 10. A pair of seat rails 14 extend rearward from the pair of main frames 10, and a seat 15 is supported by the pair of seat rails 14 from below.

A front fork 16 is steerably supported by the head pipe via a steering shaft (not shown), and a front wheel 17 is rotatably supported at a lower portion of the front fork 16. The swing arm 13 extends rearward from lower portions of the main frames 10, and a rear wheel 18 is rotatably supported by a rear end of the swing arm 13. The engine 11 is coupled to the rear wheel 18 via a chain drive type transmission mechanism, and power from the engine 11 is transmitted to the rear wheel 18 via the transmission mechanism. A muffler 19 is installed behind the engine 11, and exhaust gas from the engine 11 is discharged to the outside through the muffler 19.

As shown in FIG. 2, a meter 21 for displaying a vehicle state is installed at the vehicle front portion. A head lamp 23 (see FIG. 1) is provided in front of the meter 21, and a pair of turn signal lamps 25 are provided on lateral sides of the head lamp 23. A wind screen 26 is provided above the meter 21. The front fork 16 is provided behind the meter 21, and a handle bar 31 is provided at an upper portion of the front fork 16. A handle grip 32 and a clutch lever 33 are provided on a left side of the handle bar 31, and an accelerator grip 34 and a brake lever 35 are provided on a right side of the handle bar 31.

The saddle-type vehicle 1 may be optionally equipped with a grip heater. The grip heater is controlled by a grip heater controller, and it is necessary to add the grip heater, the grip heater controller, a harness, and the like as optional components to the saddle-type vehicle 1. As an optional component, the grip heater controller is often installed in an accommodation space below the seat, but a distance from the grip heater controller to the grip heater is long, and it is necessary to remove many components such as a cowl and the fuel tank in order to locate the harness.

The optional components are often attached by a worker of a dealer or a user, and the work burden increases as the number of components to be removed increases. It is not preferable in terms of safety to locate a high current harness from below the seat to the grip heater passing below the fuel tank filled with gasoline. Further, sufficient waterproofness and dustproofness cannot be ensured below the seat. Therefore, in the present embodiment, the grip heater controller is installed inside the meter cover with excellent waterproofness and dustproofness, and an arrangement of the harness from the grip heater controller to the grip heater is simplified.

Figure 3:
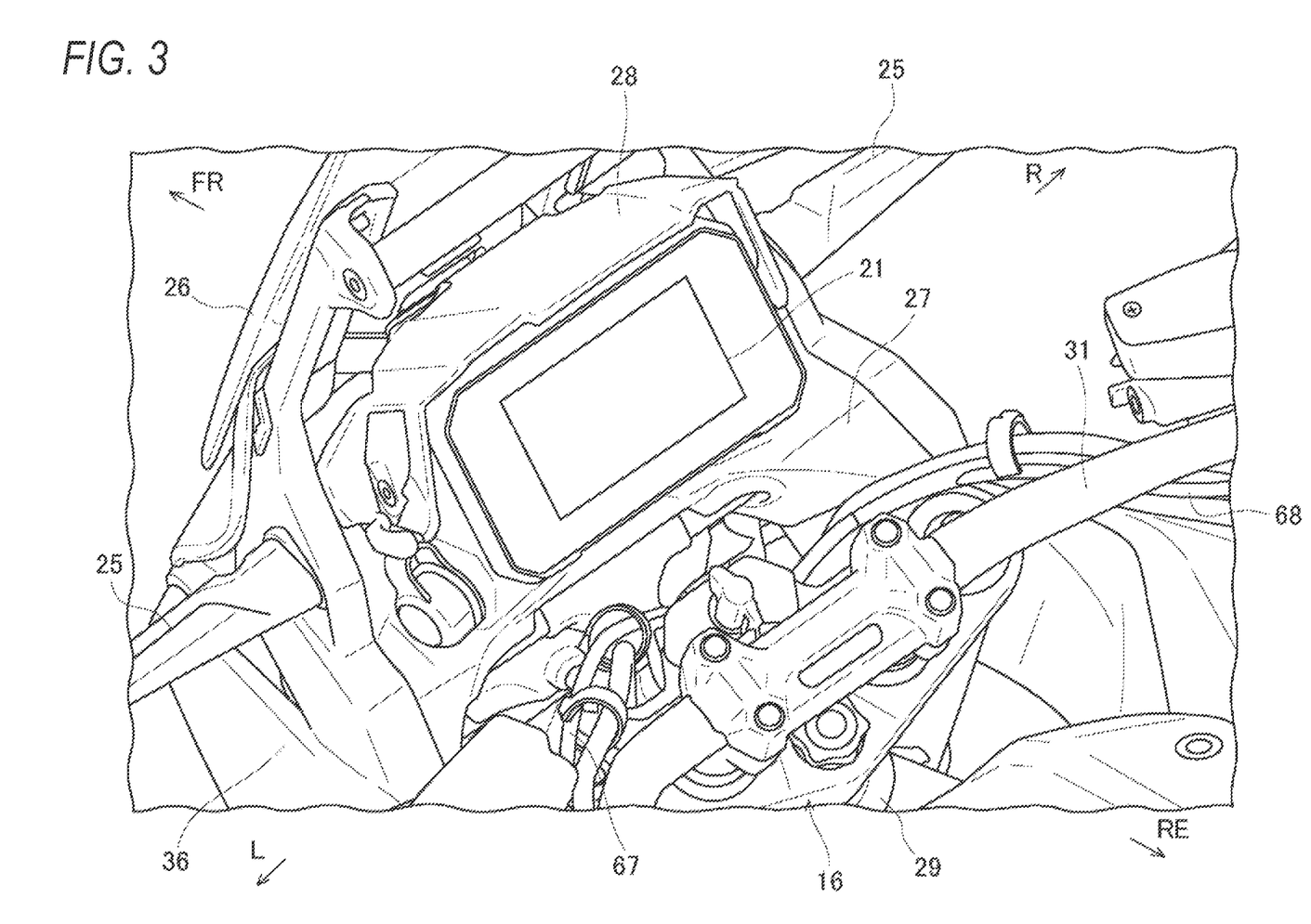
FIG. 3 is a perspective view of the vehicle front portion according to the present embodiment.
Figure 4:
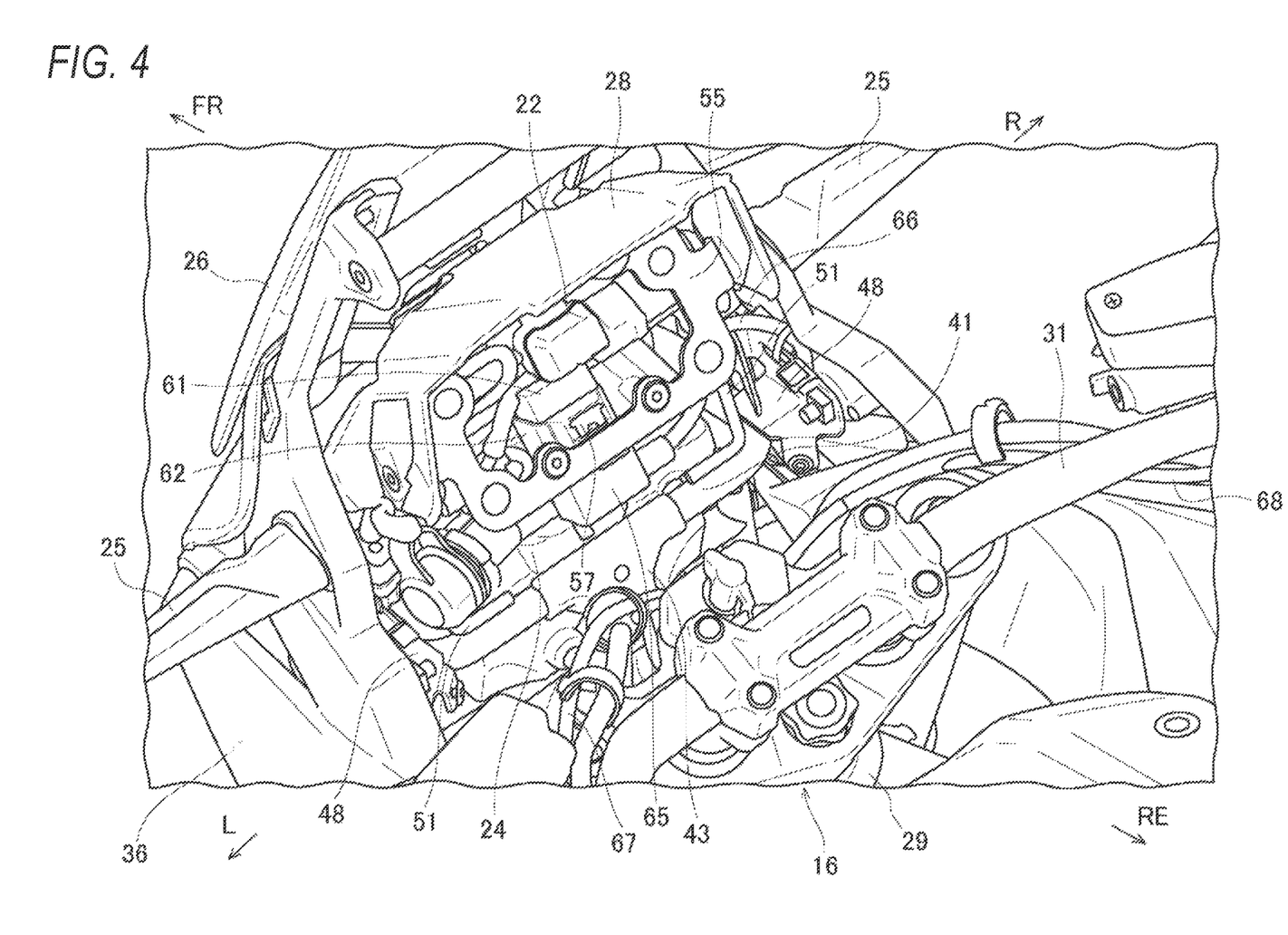
FIG. 4 is a perspective view of the vehicle front portion of FIG. 3 with a rear meter cover removed therefrom.
Figure 5:
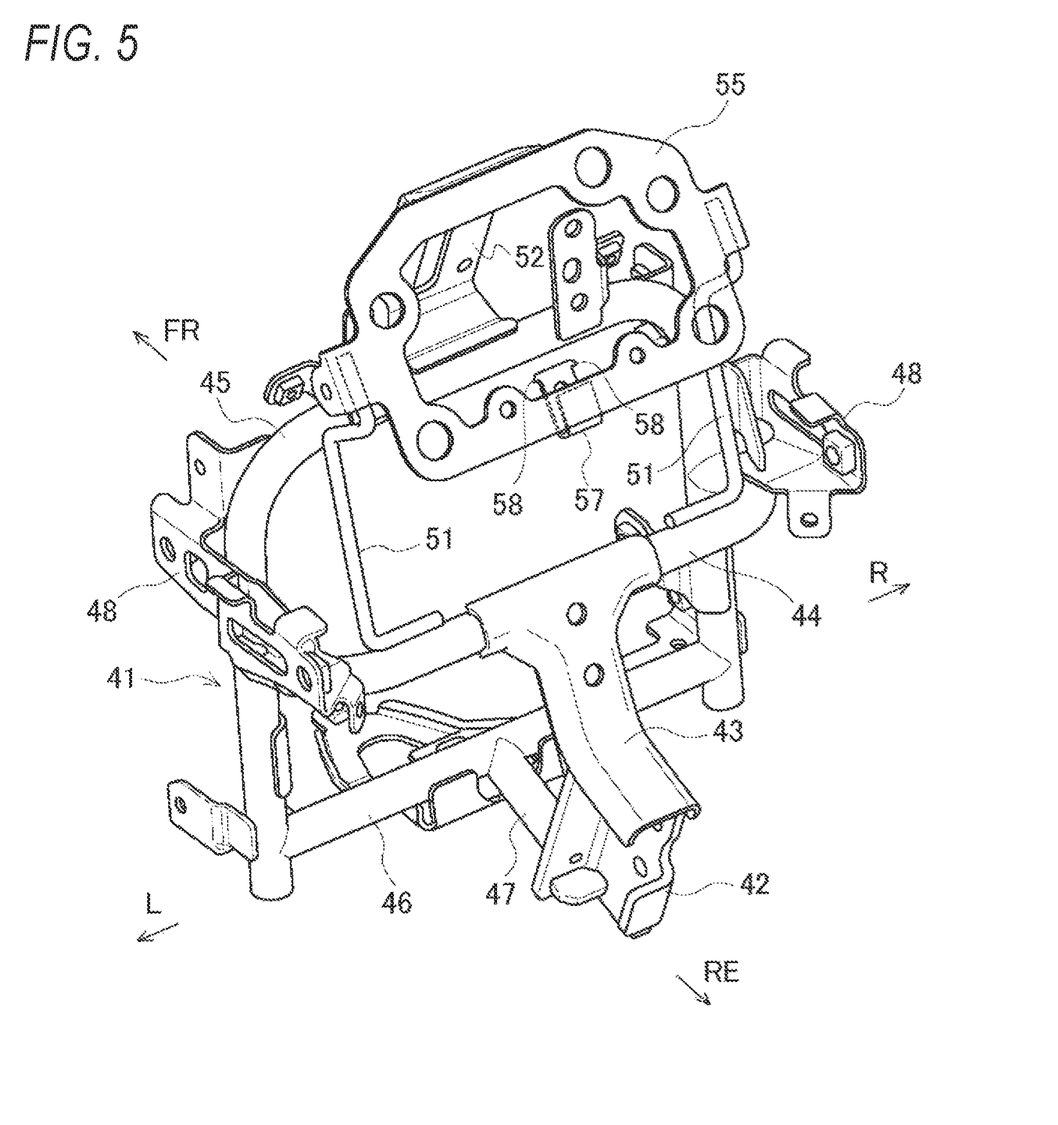
FIG. 5 is a perspective view of a holding structure of a grip heater controller according to the present embodiment.

A holding structure of the grip heater controller will be described with reference to FIGS. 3 to 5. FIG. 3 is a perspective view of the vehicle front portion according to the present embodiment. FIG. 4 is a perspective view of the vehicle front portion of FIG. 3 with a rear meter cover removed therefrom. FIG. 5 is a perspective view of the holding structure of the grip heater controller according to the present embodiment.

As shown in FIG. 3, the meter 21 is installed on a rear meter cover (meter cover) 27 in front of the front fork 16. A location on the rear meter cover 27 where the meter 21 is installed bulges upward, and the bulging portion of the rear meter cover 27 is covered with a front meter cover 28 from the front. The rear meter cover 27 covers a periphery of the meter 21, and the front meter cover 28 covers a front of the meter 21. A display screen of the meter 21 is directed obliquely rearward and upward, and an upper edge of the front meter cover 28 protrudes from the rear meter cover 27 in an eaves shape above the meter 21.

As shown in FIG. 4, a support structure of the meter 21 is accommodated inside the rear meter cover 27. A brace 41 in which a pipe member and a bracket are integrated by welding is provided in front of the front fork 16. The lamp housing 24 of the head lamp 23 (see FIG. 1) is held inside the brace 41, and a front cowl 36 is held by a pair of cowl brackets 48 on both left and right sides of the brace 41. A pair of stays 51 are joined to two portions on left and right of the brace 41 with a T-shaped bracket 43 at a center of the brace 41 interposed therebetween. The pair of stays 51 extend upward from the brace 41, and a frame-shaped plate 55 is joined to upper end portions of the pair of stays 51.

A front surface side of the plate 55 serves as a support surface that supports the meter 21 via the rear meter cover 27 (see FIG. 3). A meter connector 22 to which the meter 21 is connected is installed inside a frame of the plate 55. A holder 57 is joined to a lower frame of the plate 55, and a grip heater controller (optional component) 61 is held by the holder 57 via a rubber band 62. The meter 21 is supported on the front surface side of the plate 55 so as to be exposed from the rear meter cover 27, and the grip heater controller 61 is held inside the rear meter cover 27 by the holder 57 on a back surface side of the plate 55. A back side of the meter 21 is used as an installation space for the grip heater controller 61.

A controller connector 65 is connected to a lower portion of the grip heater controller 61. A controller harness 66 extends laterally (rightward in the present embodiment) from the controller connector 65. The controller harness 66 extends rearward along various cowls, and then extends to a battery (not shown) along a main harness on a rear side of the head pipe 29. Heater harnesses 67, 68 extend from the handle grip 32 and the accelerator grip 34 (see FIG. 2) along the handle bar 31, and the heater harnesses 67, 68 join the controller harness 66 in a vicinity of the head pipe 29.

As shown in FIG. 5, the brace 41 extends forward from the head pipe 29 (see FIG. 4) of the vehicle front portion. A rear portion of the brace 41 is an attachment bracket 42 to be attached to the head pipe 29. The T-shaped bracket 43 is joined to an upper end portion of the attachment bracket 42, and a horizontal bar portion of a center frame 44 having a U-shape in a top view is joined to a front portion of the T-shaped bracket 43. The pair of cowl brackets 48 are joined to a vicinity of bent portions on both left and right sides of the center frame 44. The pair of cowl brackets 48 project laterally from the center frame 44, and the front cowl 36 (see FIG. 4) is attached to the pair of cowl brackets 48.

Intermediate portions of vertical bar portions on both left and right sides of a front frame 45 having an inverted U-shape in rear view are joined to tip end portions on both left and right sides of the center frame 44. Both end portions of a bridge frame 46 having a horizontal bar shape are joined to lower end portions of the vertical bar portions on both left and right sides of the front frame 45, and a holding structure of the head lamp 23 (see FIG. 1) is formed by the front frame 45 and the bridge frame 46. A lower frame 47 that is long in a front-rear direction is joined to a lower end portion of the attachment bracket 42, and an intermediate portion of the bridge frame 46 is joined to a front end portion of the lower frame 47. In this way, the brace 41 has a framework structure with an open front.

The pair of stays 51 spaced apart from each other in a left-right direction (vehicle width direction) are joined to the horizontal bar portion of the center frame 44. The pair of stays 51 are bent such that upper end portions thereof are positioned more rearward than lower end portions thereof, and a pair of side edges of the plate 55 are joined to the upper end portions of the pair of stays 51. A horizontal bar portion of the front frame 45 is connected to an upper frame of the plate 55 via a reinforcing bracket 52. The brace 41 and the plate 55 are connected via the pair of stays 51 and the reinforcing bracket 52, and the plate 55 is supported by the brace 41 from below. The plate 55 is inclined such that a surface of the plate 55 is directed obliquely rearward and upward.

A holder 57 for the grip heater controller 61 (see FIG. 4) is joined to a back surface of the lower frame of the plate 55. The holder 57 is formed by folding back a small plate into a U-shape. A tip end portion of the holder 57 is directed upward, and the rubber band 62 (see FIG. 4) of the grip heater controller 61 is attached to the tip end portion of the holder 57. The grip heater controller 61 is held by the holder 57 using a space on a back side of the plate 55, that is, on the back side of the meter 21 (see FIG. 3). In the holding structure, workability of the work of attaching the grip heater controller 61 to the holder 57 is improved.

Figure 6:
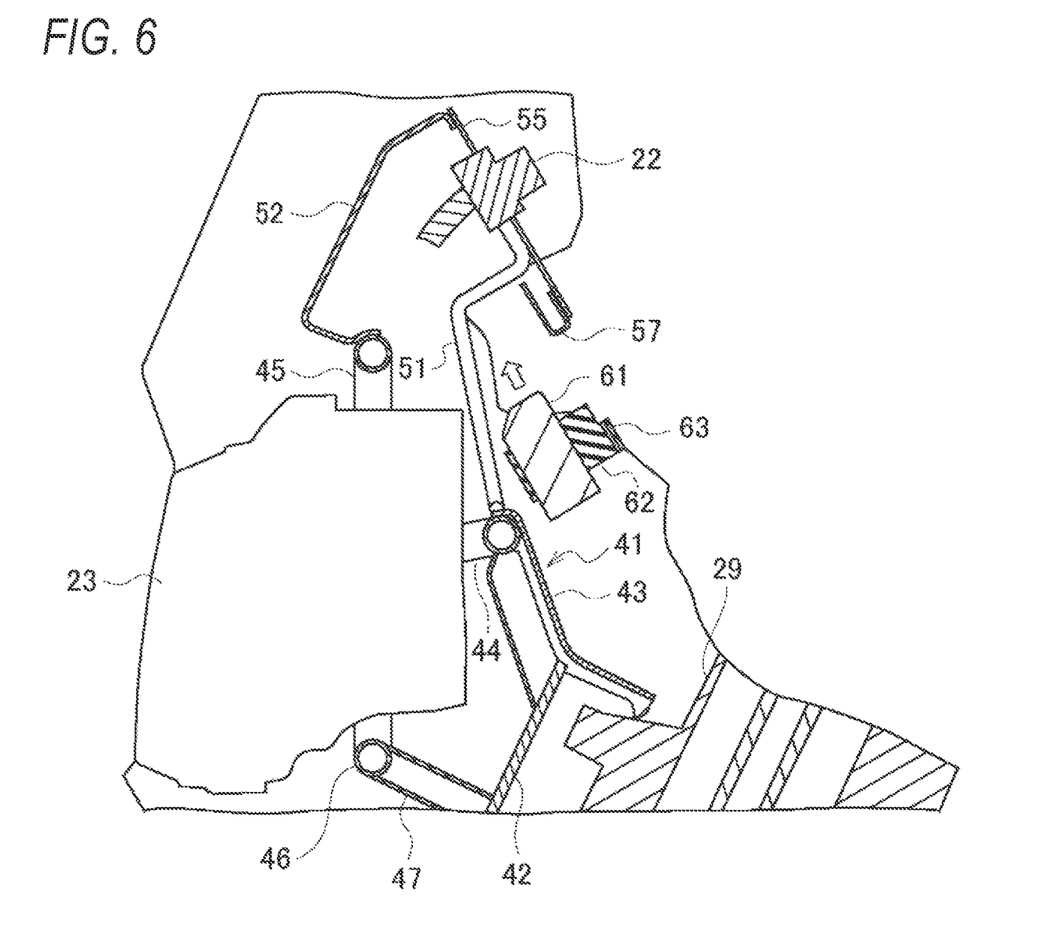
FIG. 6 is a diagram showing an example of work of attaching the grip heater controller according to present embodiment.
Figure 7:
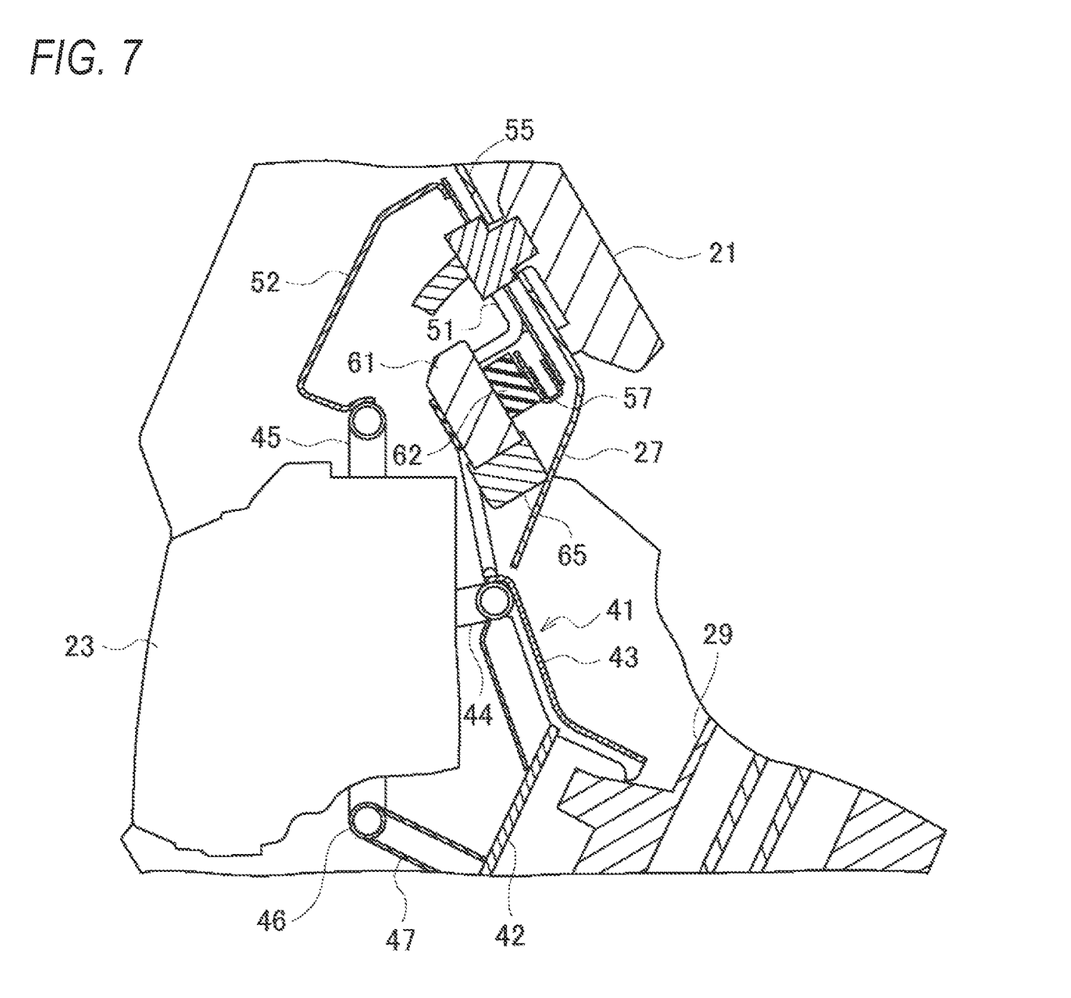
FIG. 7 is a diagram showing an example of the work of attaching the grip heater controller according to present embodiment.
Figure 8:
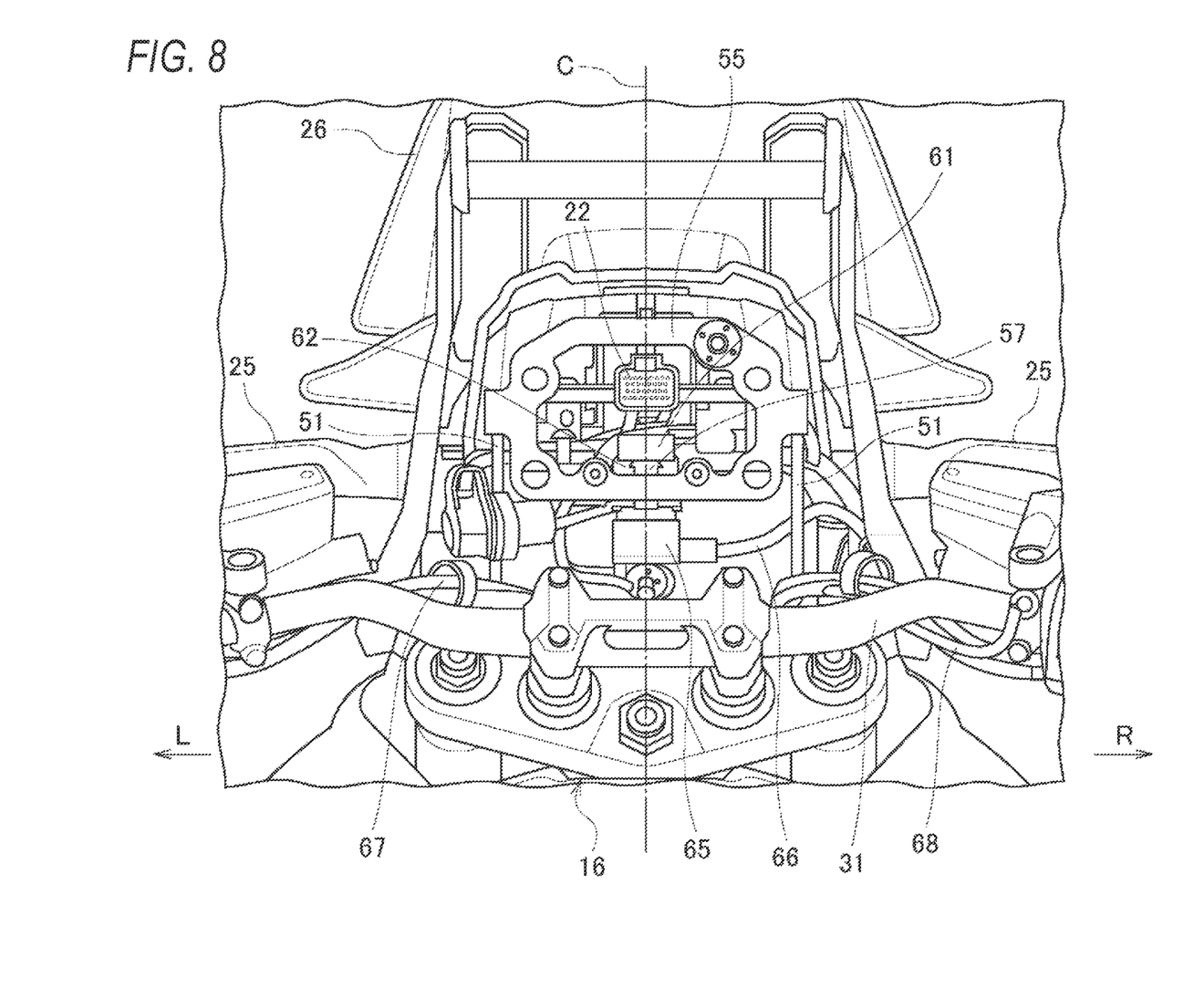
FIG. 8 is a rear view of the vehicle front portion according to present embodiment with the rear meter cover removed therefrom.

Hereinafter, the work of attaching the grip heater controller will be described with reference to FIGS. 6 to 8. FIGS. 6 and 7 are diagrams showing an example of the work of attaching the grip heater controller according to the present embodiment. FIG. 8 is a rear view of the vehicle front portion according to present embodiment with the rear meter cover removed therefrom.

As shown in FIG. 6, when the rear meter cover 27 (see FIG. 7) is not attached, the holder 57 is located such that the holder 57 is accessible from a work space provided in front of the head pipe 29, that is, a worker can extend his/her hand to the holder 57. An empty space for allowing the steering of the front fork 16 (see FIG. 4) is secured in front of the head pipe 29, and workability is improved by using the empty space as the work space. Since the T-shaped bracket 43 of the brace 41 is curved so as to be lowered rearward in a side view, the work space in front of the head pipe 29 is expanded downward.

In the side view, the plate 55 is inclined so as to be lowered rearward, and the lower frame of the plate 55 is positioned more rearward than the upper frame of the plate 55. The holder 57 is joined to the lower frame of the plate 55, and the pair of stays 51 are joined to the plate 55 above the holder 57. The pair of stays 51 are bent such that the plate 55 projects rearward, the holder 57 can be easily accessed from below the plate 55, and the workability of the work of attaching the grip heater controller 61 is improved. By positioning the stays 51 in front of the holder 57, the work of attaching the grip heater controller 61 is less likely to be disturbed by the stays 51.

Then, the grip heater controller 61 is brought close to the holder 57 from below the plate 55. A slit 63 is formed in the rubber band 62 of the grip heater controller 61, and the tip end portion of the holder 57 is inserted into the slit 63 of the rubber band 62. The tip end portion of the holder 57 protrudes from the rubber band 62, the rubber band 62 is prevented from coming off from a protrusion 58 (see FIG. 5) at the tip end portion of the holder 57, and the grip heater controller 61 is held by the holder 57 via the rubber band 62. Since a sufficient work space is secured in front of the head pipe 29, the grip heater controller 61 can be easily attached to the holder 57.

As shown in FIG. 7, when the grip heater controller 61 is held by the holder 57, the controller connector 65 is connected to the lower portion of the grip heater controller 61. The controller harness 66 (see FIG. 8) is connected to the controller connector 65, and as described above, the controller harness 66 joins the heater harnesses 67, 68 (see FIG. 8) in the vicinity of the head pipe 29. By attaching the grip heater controller 61 to the vicinity of the meter 21, a wiring from the grip to the grip heater controller 61 can be simplified. Further, there is no need to make the harness pass below the fuel tank 12 (see FIG. 1) or the like.

The rear meter cover 27 and the meter 21 are attached to the front surface side of the plate 55, and the grip heater controller 61 is positioned on the back side of the meter 21. Since the back side of the meter 21 is covered with the front meter cover 28 and the rear meter cover 27 at the front, rear, left, and right upper sides, the waterproofness and the dustproofness are improved, which is suitable for installation of the grip heater controller 61. Since the harness for the meter 21 is already passed through the back side of the meter 21, the power supply to the grip heater controller 61 is easily taken out. If the controller connector 65 is located in advance, the attachment work can be further simplified.

The grip heater controller 61 is attached to the back side of the meter 21 by detaching and attaching the rear meter cover 27 and the meter 21. The grip heater controller 61 can be attached without removing large components such as the fuel tank 12 and the cowl, thereby reducing the work burden on the worker. Since the grip heater controller 61 is installed on the back side of the meter 21, the accommodation space below the seat 15 (see FIG. 1) is not narrowed due to the installation of the grip heater controller 61. In this way, the grip heater can be easily added to the saddle-type vehicle 1.

As shown in FIG. 8, the holder 57 is positioned on a vehicle body center line C between the pair of stays 51. A work space is secured between the pair of stays 51, and the grip heater controller 61 is easily attached to the holder 57. Since the holder 57 is positioned on the vehicle body center line C, the grip heater controller 61 can have a degree of freedom in size or the like. Further, since the grip heater controller 61 is attached by inserting the rubber band 62 into the holder 57, the holder 57 can cope with attachment of various types of grip heater controllers.

As described above, according to the present embodiment, the periphery of the meter 21 is covered with the rear meter cover 27, and the holder 57 is provided on the plate 55 that supports the meter 21. Since the grip heater controller 61 is held on the holder 57 inside the rear meter cover 27, the waterproofness and the dustproofness for the grip heater controller 61 can be secured. By removing the meter 21 and the rear meter cover 27, the grip heater controller 61 can be attached to the holder 57, which eliminates the necessity of removing a large cowl or the like and simplifies the attachment work.

In the present embodiment, the grip heater controller is exemplified as the optional component, but the optional component may be a component to be added in addition to the standard equipment of the saddle-type vehicle.

In the present embodiment, the optional component is held on the holder on the back side of the meter, but it is sufficient that the optional component is held inside the meter cover by the holder.

Further, in the present embodiment, the brace has a holding structure of the head lamp and the plate, but it is sufficient that the brace is formed so as to be able to support the plate from below.

In the present embodiment, the plate is formed in a frame shape, but a shape of the plate is not particularly limited as long as the plate can support the meter and the holder can be provided thereon.

Further, in the present embodiment, the holder is formed by folding back a small plate into a U-shape, but the holder may have any shape as long as the holder can hold the optional component. Further, although the holder holds the optional component via the rubber band, the holder may be formed so as to be able to directly hold the optional component.

Further, in the present embodiment, the plate is inclined so as to be lowered rearward, but the orientation of the plate is not particularly limited. The plate may be oriented vertically or horizontally.

Further, in the present embodiment, the plate and the brace are connected by the pair of stays, but the plate and the brace may be connected by a single stay.

The optional component holding structure is not limited to the saddle-type vehicle shown in the drawings, and may be applied to saddle-type vehicles of other types. The saddle-type vehicle is not limited to general vehicles on which a rider rides in a posture of straddling a seat, and also includes a small-sized scooter-type vehicle on which a rider rides without straddling a seat.

As described above, a holding structure for an optional component (grip heater controller 61) of the present embodiment is the holding structure for the optional component, the optional component configured to be added to a saddle-type vehicle (1). The holding structure for the optional component includes: a brace (41) extending forward from a head pipe (29) of a vehicle front portion; a plate (55) supported from below by the brace; and a holder (57) for the optional component provided on the plate. A periphery of a meter (21) configured to display vehicle information is covered with a meter cover (rear meter cover 27), and the meter is supported by the plate so as to be exposed from the meter cover, and the optional component is held inside the meter cover by the holder. According to the configuration, the periphery of the meter is covered with the meter cover, and the holder is provided on the plate that supports the meter. By holding the optional component on the holder inside the meter cover, the waterproofness and dustproofness for the optional component can be ensured. By removing the meter and meter cover, the optional component can be attached to the holder, which eliminates the necessity of removing a large cowl and simplifies the attachment work.

In the holding structure for the optional component of the present embodiment, the meter is supported by the plate so as to be exposed from the meter cover on a front surface side of the plate, and the optional component is configured to be held inside the meter cover by the holder on a back surface side of the plate. According to the configuration, a back side of the meter can be used as an installation space for the optional component.

In the holding structure for the optional component of the present embodiment, when the meter cover is not attached, the holder is located such that the holder is accessible from a space provided in front of the head pipe. According to the configuration, the optional component is attached to the holder from the front of the head pipe. By using an empty space in front of the head pipe, the workability of the work of attaching the optional component can be improved.

The holding structure for the optional component of the present embodiment further includes a stay (51) connecting the brace and the plate, the plate is inclined so as to be lowered rearward, the holder is provided at a lower portion of the plate, and the stay is connected to the plate above the holder. According to the configuration, the work of attaching the optional component to the holder is less likely to be hindered by the stay.

In the holding structure for the optional component of the present embodiment, in a side view, the stay is bent such that the plate overhangs rearward. According to the configuration, the holder can be easily accessed from below the plate, and the workability of the work of attaching the optional component can be improved.

In the holding structure for the optional component of the present embodiment, the stay includes a pair of stays spaced apart from each other in a vehicle width direction, and the holder is positioned between the pair of stays. According to the configuration, a work space is secured between the pair of stays, and the grip heater controller is easily attached to the holder.

In the holding structure for the optional component according to the present embodiment, the optional component is a grip heater controller. According to the configuration, since the grip heater controller is attached near the meter, a wiring from a grip to the grip heater controller can be simplified.

Although the present embodiment has been described, the above-described embodiment and the modification may be combined entirely or partially as another embodiment.

The technique of the present invention is not limited to the above-described embodiment, and various changes, substitutions and modifications may be made without departing from the spirit of the technical idea of the present invention. The present invention may be implemented by other methods as long as the technical concept can be implemented by the methods through advance of the technique or other derivative techniques. Accordingly, the claims cover all embodiments that may be included within the scope of the technical idea.

What is claimed is:

1. A saddle-type vehicle, comprising:
   a head pipe provided in a vehicle front portion;
   a pair of stays spaced apart from each other in a vehicle width direction; and
   a holding structure for an optional component, the optional component configured to be added to the saddle-type vehicle, wherein
   the holding structure for the optional component includes:
     a brace extending forward from the head pipe;
     a plate supported from below by the brace; and
     a holder for the optional component provided on the plate,
   each of the stays connects the brace and the plate,
   a periphery of a meter configured to display vehicle information is covered with a meter cover, and
   the meter is supported by the plate so as to be exposed from the meter cover, and the optional component is held inside the meter cover by the holder,
   a left one of the stays is disposed at a left side with respect to a center line of a vehicle body of the saddle-type vehicle in the vehicle width direction, and a right one of the stays is disposed at a right side with respect to the center line in the vehicle width direction, and
   the holder is disposed at a middle position between the left one of the stays and the right side of the stays.

2. The saddle-type vehicle according to claim 1, wherein the meter is supported by the plate so as to be exposed from the meter cover on a front surface side of the plate, and the optional component is configured to be held inside the meter cover by the holder on a back surface side of the plate.

3. The saddle-type vehicle according to claim 1, wherein when the meter cover is not attached, the holder is located such that the holder is accessible from a space provided in front of the head pipe.

4. The saddle-type vehicle according to claim 1 wherein the plate is inclined so as to be lowered rearward, the holder is provided at a lower portion of the plate, and the stays are connected to the plate above the holder.

5. The saddle-type vehicle according to claim 4, wherein in a side view, the stays are bent such that the plate overhangs rearward.

6. The saddle-type vehicle according to claim 1, wherein the optional component is a grip heater controller.

7. The saddle-type vehicle according to claim 2, wherein when the meter cover is not attached, the holder is located such that the holder is accessible from a space provided in front of the head pipe.

8. The saddle-type vehicle according to claim 1, wherein:
the meter is provided on the vehicle front portion,
a front fork is provided behind the meter, and
a handle bar is provided at an upper portion of the font fork.

9. The saddle-type vehicle according to claim 1, wherein the holder is positioned on the center line of the vehicle body of between the pair of stays.

10. A saddle-type vehicle, comprising:
a head pipe provided in a vehicle front portion;
a pair of stays spaced apart from each other in a vehicle width direction; and
a holding structure for an optional component, the optional component configured to be added to the saddle-type vehicle, wherein
the holding structure for the optional component includes:
a brace extending forward from the head pipe;
a plate supported from below by the brace; and
a holder for the optional component provided on the plate, each of the stays connects the brace and the plate,
a periphery of a meter configured to display vehicle information is covered with a meter cover, and
the meter is supported by the plate so as to be exposed from the meter cover, and the optional component is held inside the meter cover by the holder, the meter is provided on the vehicle front portion,
a front fork is provided behind the meter,
the meter is positioned on a center line of a vehicle body of the saddle-type vehicle in the vehicle width direction,
the holder is disposed at a right side with respect to a left end of the meter in the vehicle width direction and at a left side with respect to a right end of the meter in the vehicle width direction.

11. The saddle-type vehicle according to claim 10, further comprising a handle bar provided at an upper portion of the font fork.

12. A saddle-type vehicle, comprising:
a head pipe provided in a vehicle front portion;
a pair of stays; and
a holding structure for an optional component, the optional component configured to be added to the saddle-type vehicle, wherein
the holding structure for the optional component includes:
a brace extending forward from the head pipe;
a plate supported from below by the brace; and
a holder for the optional component provided on the plate,
a periphery of a meter configured to display vehicle information is covered with a meter cover, and
the meter is supported by the plate so as to be exposed from the meter cover, and the optional component is held inside the meter cover by the holder, and
the holder is positioned on a center line of the straddle-type vehicle between the pair of stays.

* * * * *